United States Patent [19]
Yamamoto

[11] Patent Number: 6,112,041
[45] Date of Patent: *Aug. 29, 2000

[54] IMAGE FORMING APPARATUS WITH DENSITY ADJUSTMENT

[75] Inventor: Takeo Yamamoto, Toride, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/311,880

[22] Filed: May 14, 1999

[30] Foreign Application Priority Data

May 20, 1998 [JP] Japan ................................. 10-153699

[51] Int. Cl.⁷ .................................................... G03G 15/00
[52] U.S. Cl. ......................... 399/138; 358/1.16; 358/401
[58] Field of Search ...................... 399/1, 138; 358/1.16, 358/1.17, 401, 448

[56] References Cited

U.S. PATENT DOCUMENTS

| | | | |
|---|---|---|---|
| 4,630,918 | 12/1986 | Yui et al. ................................. | 399/138 |
| 5,355,200 | 10/1994 | Ohba et al. ............................. | 399/138 |
| 5,572,303 | 11/1996 | Arimoto ................................... | 399/303 |

FOREIGN PATENT DOCUMENTS

| | | |
|---|---|---|
| 3-140263 | 6/1991 | Japan . |
| 4-14956 | 1/1992 | Japan . |
| 9-224110 | 8/1997 | Japan . |

*Primary Examiner*—Joan Pendegrass
*Attorney, Agent, or Firm*—Fitzpatrick, Cella, Harper & Scinto

[57] ABSTRACT

An image forming apparatus has an image forming device and a changing device, and the image forming device is capable of forming an image by the use of a recording device, and forming an image without the use of the recording device, and when an image is to be formed without the use of the recording device, the changing device converts the image signal and changes the density of the image, and when an image is to be formed by the use of the recording device, the changing device does not convert the image signal, but controls the image forming condition of the image forming device and changes the density of the image when the density of the image is to be changed in the course of the formation of the image.

19 Claims, 7 Drawing Sheets

IMAGE FORMING APPARATUS WITH DENSITY ADJUSTMENT

BACKGROUND OF THE INVENTION

Field of the Invention

This invention relates to an image forming apparatus using an electrophotographic system or the like, such as a copying apparatus or a printer.

Related Background Art

For the sake of convenience, a copying apparatus will hereinafter be described as an example of the image forming apparatus according to the prior art.

Apparatuses to which a digital system is applied have spread as the latest copying apparatuses or the like. The digital system is a system which handles an image signal as a digital signal and accordingly, in a copying apparatus using the digital system, a signal read by a reader portion is once converted into a digital electrical signal, and on the basis of this digital signal, the light emitting means of a laser is modulated and caused to emit light, whereby an image is formed on an image bearing member such as a photosensitive drum.

Also, the technique of causing an image signal to be once recorded in an image memory which is a recording device is used preferably because it can efficiently effect the preparation of a plurality of originals to be copied and a both-surface (two sided) original to be copied, and the processing, editing and the like of image data.

For example, in an analog copying apparatus or a digital copying apparatus having no recording device, there has been the limitation that the reading of the same original for a necessary number of times or the number of copied originals to be discharged depends on the number of sorting bins of the image forming apparatus, but in a digital copying apparatus having a recording device, reading can be done basically once for an original and the limitation of the number of discharged copies can be made null.

Now, when the density of an output image is to be changed when image formation is done by the use of this recording device, for example, when a plurality of copied originals are formed from an original, use has been made of the technique of varying an image signal in conformity with a user's designation.

The volume of density change such as making an original dark or light, when, for example, it is desired to express the original more darkly or it is desired to remove the background of the original, is changed from an operating portion or the like to cope with the desire by subjecting a corresponding image signal to a calculation such as addition, subtraction, multiplication or division.

However, when density change is to be effected during image formation using the above-described recording device, the image signal is changed, and this has led to the problem that the feed back to an output image is delayed by the time required for the processing thereof.

Further, in an image forming apparatus in which in order to increase original information recordable into a recording device, the original information which is a multi-valued signal is changed to binary by an error diffusion method or the like and is recorded into the recording device, it has been necessary to change the original information to multiple values, and subject it to a predetermined change, and thereafter again change it to binary, in order to manipulate an image signal recorded by the recording device.

When this technique is used, the loss of or a change in image information may sometimes occur, and it has been difficult to always provide good images.

To cope with these, mention may be made of the technique of providing a recording device which can record image information in the state of a multi-valued signal, or reading the original again and manipulating the image signal so as to become a desired output image. However, the recording in the state of a multi-valued signal results in a decrease in recordable original information, or an increase in the cost of the apparatus resulting from an increase in the capacity of the recording device, and in the case where the original is read again, new problems such as the interruption of jobs and a reduction in productivity arise.

SUMMARY OF THE INVENTION

It is an object of the present invention to provide an image forming apparatus which can form an image without any reduction in productivity and without the loss of or a change in image information even if the density of the image is changed in the course of image formation using a recording device.

It is another object of the present invention in which when images are to be formed on a plurality of recording mediums from an original, it suffices to effect the reading of the original only once.

DESCRIPTION OF THE PREFERRED EMBODIMENTS

An image forming apparatus according to the present invention will hereinafter be described in greater detail with reference to the drawings.

[Embodiment 1]

A first embodiment of the image forming apparatus according to the present invention will hereinafter be described with reference to FIGS. 1 to 3. The image forming apparatus of the present embodiment is a copying apparatus utilizing the electrophotographic process.

Figure 1:
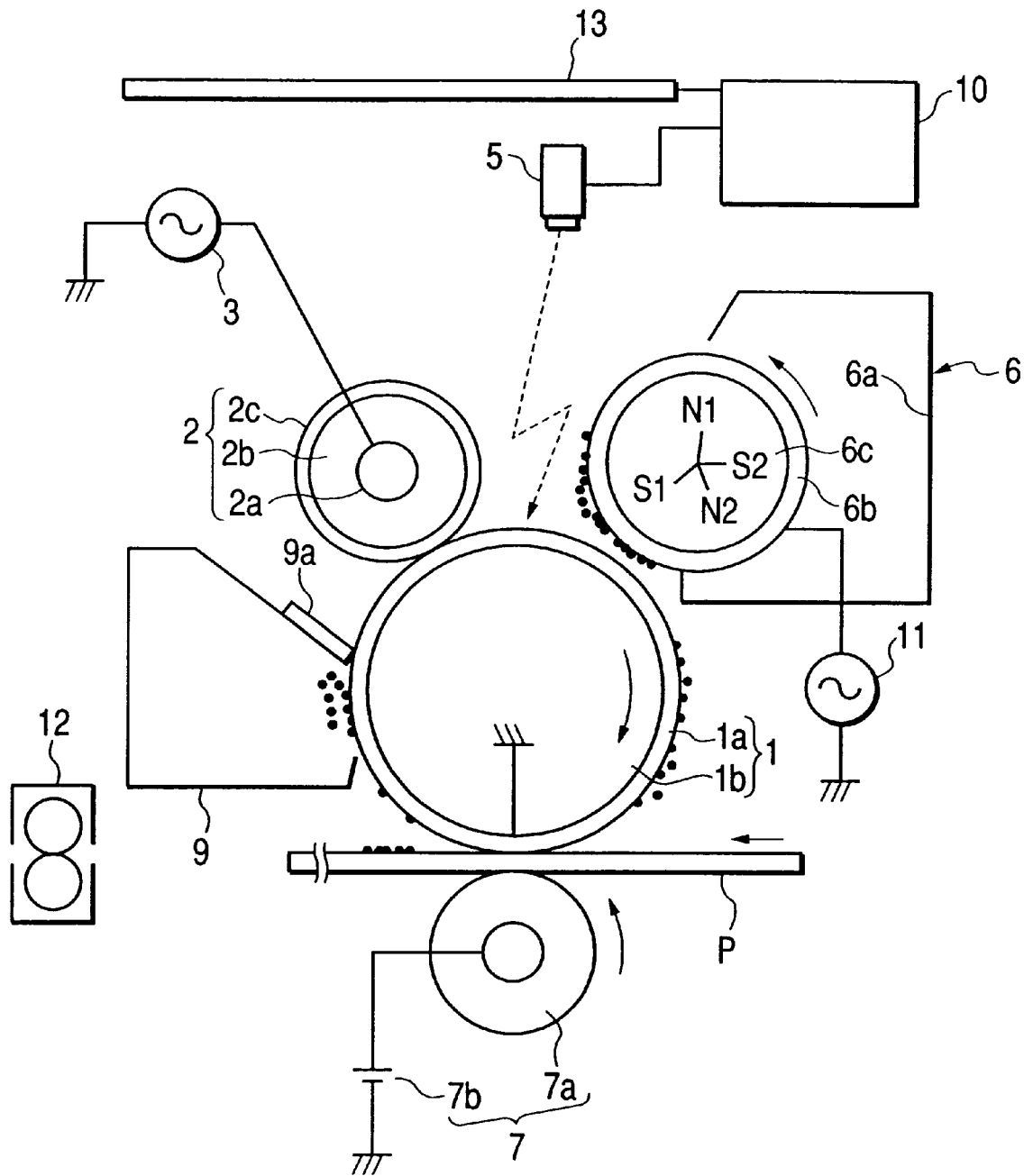
FIG. 1 schematically shows the construction of an image forming apparatus according to first to third embodiments.

Referring to FIG. 1, the copying apparatus of the present embodiment is provided with a member 1 to be charged substantially at the center thereof. The member 1 to be charged in the present embodiment is an electrophotographic photosensitive body which is a rotatable drum type image bearing member, and is basically comprised of an electrically conductive base layer 1b such as aluminum, and a photoconductive layer 1a formed on the surface thereof. Also, it is rotatively driven in the direction of arrow at a process speed (peripheral velocity) of 200 mm/sec.

Around the photosensitive body 1, there are disposed a charging member 2, a developing device 6, a transferring device 7 and a cleaning device 9 and the like.

In the present embodiment, the charging member 2 is a so-called charging roller of the roller type. The charging roller 2 is comprised of a central mandrel 2a, an electrically conductive layer 2b formed on the outer periphery thereof, and a resistance layer 2c further formed on the outer periphery thereof.

The charging roller 2 has the opposite end portions of its mandrel 2a rotatably supported by a bearing member, not shown, and is disposed parallel to the photosensitive body 1 and urged against the photosensitive body 1 with a predetermined pressure force by urging means, not shown, and rotates following the rotative driving of the photosensitive body 1.

A DC voltage of −750 V, an AC voltage 1.8 kVpp and a bias voltage of a frequency 1800 Hz are applied from a bias applying voltage source 3 to the charging roller 2, and the outer peripheral surface of the photosensitive body 1 is charged to −700 V.

The charged surface of this photosensitive body 1 is subjected to the exposure of desired image information (laser beam scanning exposure, slit exposure of an original image or the like, and in the present embodiment, laser beam scanning exposure), whereby an electrostatic latent image corresponding to the desired image information is formed on the charged surface of the photosensitive body. Also, at this time, the quantity of light of a stationary spot on the surface of the photosensitive body 1 is 0.9 mW (milliwatt) and the wavelength thereof is 780 nm. Further, the surface potential of the outer peripheral surface of the photosensitive body 1 at a point irradiated with a laser is −150 V.

The developing device 6 is provided with a developing container 6a containing a developer (toner) therein, and a developing sleeve 6b which is a developer bearing member disposed at a distance of 0.3 mm from the photosensitive body 1, and a magnet 6c as magnetic field producing means having magnetic poles S1, S2, N1 and N2 is fixedly disposed in the developing sleeve 6b.

The electrostatic latent image then has the toner attached thereto by the developing device 6 and is visualized as a toner image. A developing bias comprising an AC component of a frequency 1800 Hz and Vpp 1400 V and a DC component of −500 V superposed one upon the other is applied from a developing bias voltage source 11 to the developing sleeve 6a, whereby jumping development is effected. A negative toner is used as the toner and a reversal developing system is adopted.

The toner image is then transferred to a transfer material P as a recording medium by the transferring device 7. The transferring device 7 is provided with a rotatable transfer roller 7a and a power source 7b, and charging of the polarity opposite to that of the toner is effected from the back side of the transfer material P by the power source 7b, whereby the toner image on the photosensitive body 1 is sequentially transferred to the upper surface of the transfer material P. The transfer material P is converted from a conveying device, not shown, to the transferring portion between the photosensitive body 1 and the transfer roller 7a with proper timing in synchronism with the rotation of the photosensitive body 1. In the present embodiment, transfer was effected with a DC voltage of 3500 V applied to an electrically conductive rubber roller of a diameter 16 mm having resistance of $5 \times 10^8$ $\Omega$ as the transfer roller 7a.

The transfer material P to which the toner image has been transferred is then separated from the photosensitive body 1 and is conveyed to a fixing device 12, where the toner image is fixed, whereafter the transfer material P is discharged out of the apparatus body, or conveyed to a re-conveying means to the transferring portion if image formation is to be effected also on the back of the transfer material P.

After the transfer, the photosensitive body 1 has any untransferred toner thereon scraped off by the cleaning blade 9a of the cleaning device 9, and is initialized with the removal of the charge by exposure effected in preparation for the next image formation.

Now, the charging roller 2 of the contact charging type and the transfer roller 7a may have gears mounted thereon and may be forcibly driven by driving means such as a motor.

Figure 2:
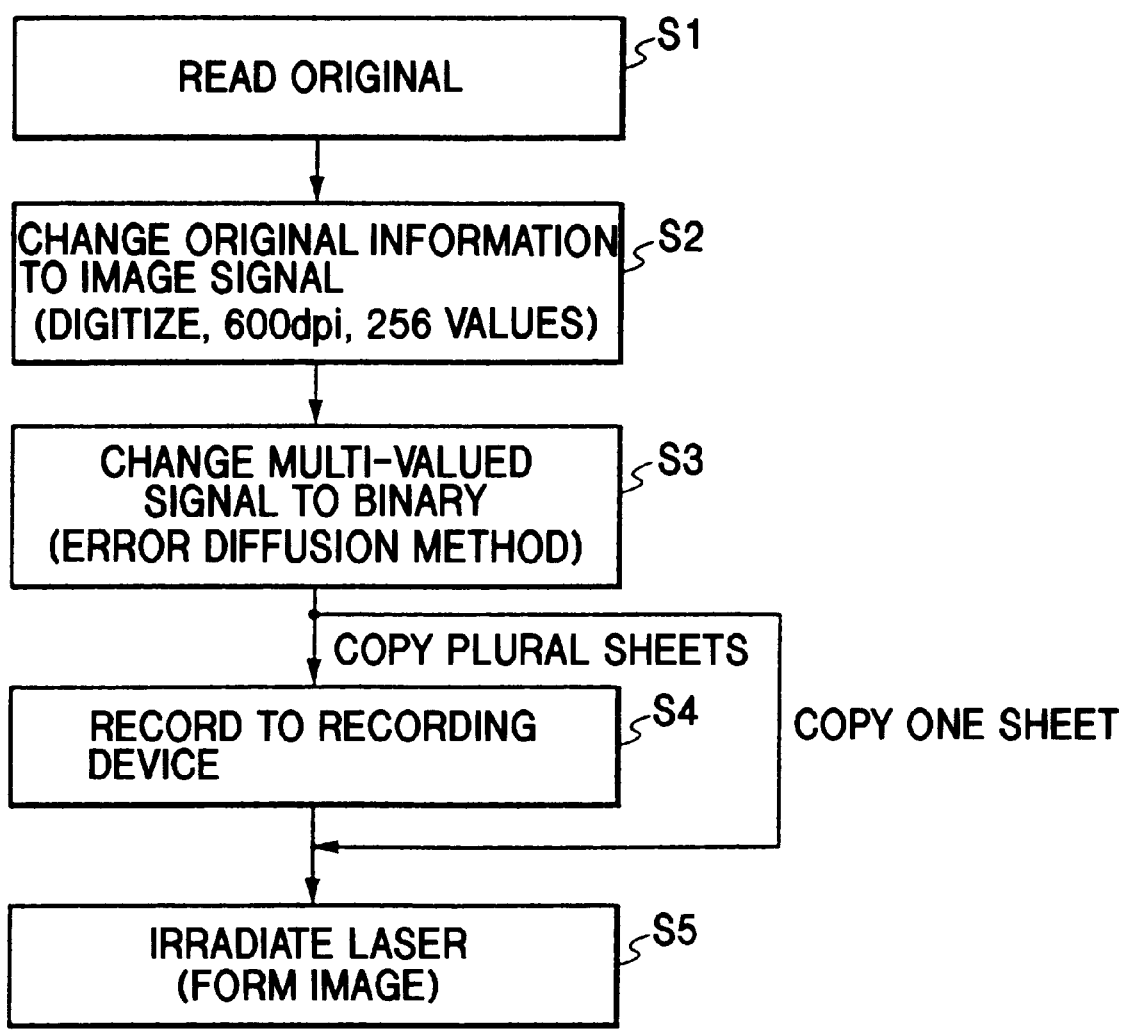
FIG. 2 is a flow chart showing the flow of an image signal in the first to third embodiments.

The flow of an image signal and an image conversion signal from an original reading device 13 to an image memory 10 which is a recording device is shown in the flow chart of FIG. 2.

In FIG. 2, the original reading device 13 reads original information (S1) and converts this original information into an image signal of 600 dpi, 256 values (S2). Further, in the recording device 10, the image signal of 600 dpi, 256 values is converted into a binary image conversion signal of 600 dpi by the error diffusion method (S3), and this is recorded in the recording area of the recording device 10 (S4), and then a laser is emitted by exposure means 5 and image formation is effected (S5).

The memory capacity of the recording device 10 can record image information corresponding in amount to about 300 sheets of standard originals of 64 MB and A4 size having an image percentage of 6%.

Also, in a case where one copy of each original is to be formed in the copying apparatus of the present embodiment (hereinafter referred to as "NtoN"), image formation is effected without the recording device 10 being used. This is for preventing the time required until the first copy image is discharged (hereinafter referred to as "FCOT": first copy time) from being lengthened to effect the recording of the image conversion signal into the recording device 10 and the evolution of the image conversion signal from the recording device 10 if the recording device 10 is used.

On the other hand, in a case where plural copies of each original are to be formed (hereinafter referred to as "NtoaN, a $\geq$ 2") and a case where image formation is to be effected on the both surfaces of the transfer material P or two or more originals are to be formed into a copy image (hereinafter referred to as "Min"), image formation is effected by the use of the recording device 10.

By using the recording device 10, the minimization of the frequency of the reading of the original and the minimization of image formation can be accomplished and the limit of the number of discharged originals can be set to a desired value.

First, when by the use of the recording device 10, for example, the density change in the course of the image formation of "NtoaN, a $\leq$ 2" was done by varying the image conversion signal, a time for forming five sheets of copy images was required until the density change was carried out. This is because the image conversion signal once changed to binary was changed to multiple values, whereafter the image signal was subjected to a calculation and was further changed to binary, whereby much time was required for these image processings. The term "binary" means that when a sheet of image is formed, the quantity of laser light comprises two values of ON and OFF and the power of the quantity of laser light is not changed.

Also, character information of three points or less has sometimes resulted in the loss of or a variation in image information. Particularly, in a character of twenty or more strokes, the probability was nearly 2%. When in order to prevent these, the image signal to the recording device was recorded while it remained 256 values, only about 20 sheets of A4 originals of 6% could be recorded, and when the originals became many, the work of dividing the number thereof became necessary.

Further, when the capacity of the recording device was increased in an attempt to increase the number of recordable originals to about 300 sheets, the cost of the recording device was increased five times or more, and it became difficult to provide an inexpensive image forming apparatus.

So, in the present embodiment, the density change in the course of image formation using the recording device 10 was carried out by varying the DC component of the developing bias without converting the image signal. The density change is effected by the display of a liquid crystal screen or a density changing lever or the like on the operating panel of the image forming apparatus.

Specifically, when the levels of the volume of density change were determined as −3, −2 and −1 for light ones, and as +1, +2 and +3 for dark ones and the respective DC components were varied to seven stages, i.e., −350 V (−3 level), −400 V (−2 level), −450 V (−1 level), −500 V (normal state, 0 level), −550 V (+1 level), −600 V (+2 level) and −650 V (+3 level) to thereby effect image formation, the density could be changed from the copy image immediately after the user carried out density change. This is because the image signal need not be subjected to a calculation and momentarily the developing bias can be changed over.

Also, the image signal changed to binary remains intact and therefore did not result in the loss of or a change in the image information, and good images could be provided inexpensively.

Figure 3:
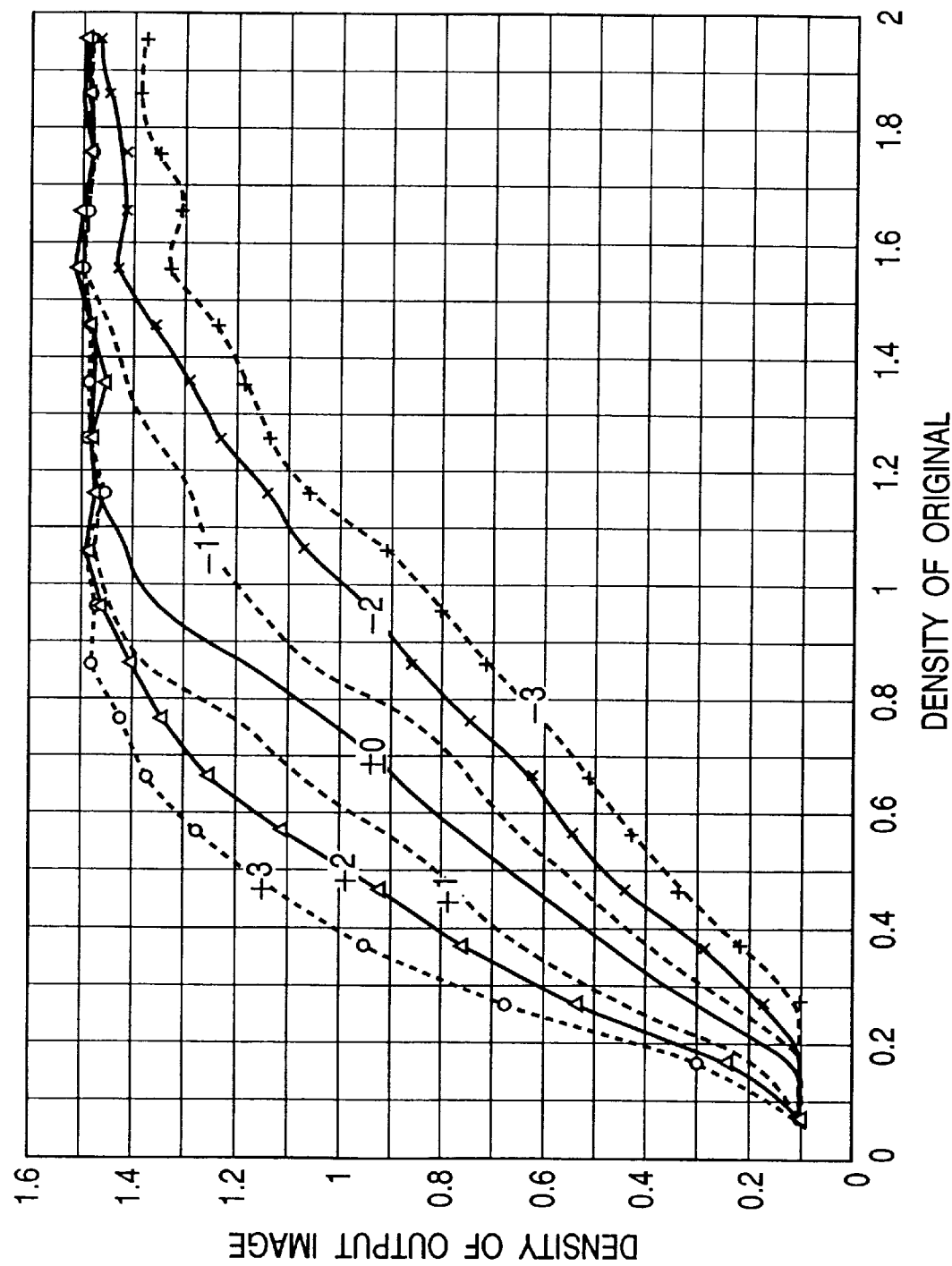
FIG. 3 is a graph showing the relation between the density of an original and the density of an output image in each volume of density change in the first to third embodiments.

The graph of FIG. 3 shows the relation between the density of the original and the density of the output image in the above-described respective volumes of density change.

While in the present embodiment, the stages of the changeover of the density and the values of the developing bias have been shown as previously described, this is not restrictive, but the arbitrary setting of the stages of the changeover of the density and the developing bias can of course be done.

On the other hand, when the volume of density change has been changed when an image is to be copied on only a sheet of transfer material, the image forming process condition such as the developing bias is not changed, but the image signal is converted to thereby effect density change. Also, even when an image is to be copied on a plurality of sheets of transfer materials, during the time until the volume of density change is changed during the copying on the first sheet of transfer material, the density is determined by the conversion of the image signal in accordance with the setting of the volume of density change set before the copying.

[Embodiment 2]

A second embodiment of the present invention will now be described with reference to FIGS. 4 to 6.

In the first embodiment, the density change in the course of the image formation using the recording device was carried out by changing the developing bias, but in this technique, if an attempt is made to make the density higher than a predetermined level, there may occur a fogged image in which the toner adheres to the white background portion, and it has been difficult to vary the density without any fog over a predetermined range. Likewise, if an attempt is made to make the density lower than the predetermined level, a reversal fogged image in which a toner of the opposite polarity adheres to the white background portion has sometimes occurred in a low humidity environment of humidity 10% or less.

Figure 4:
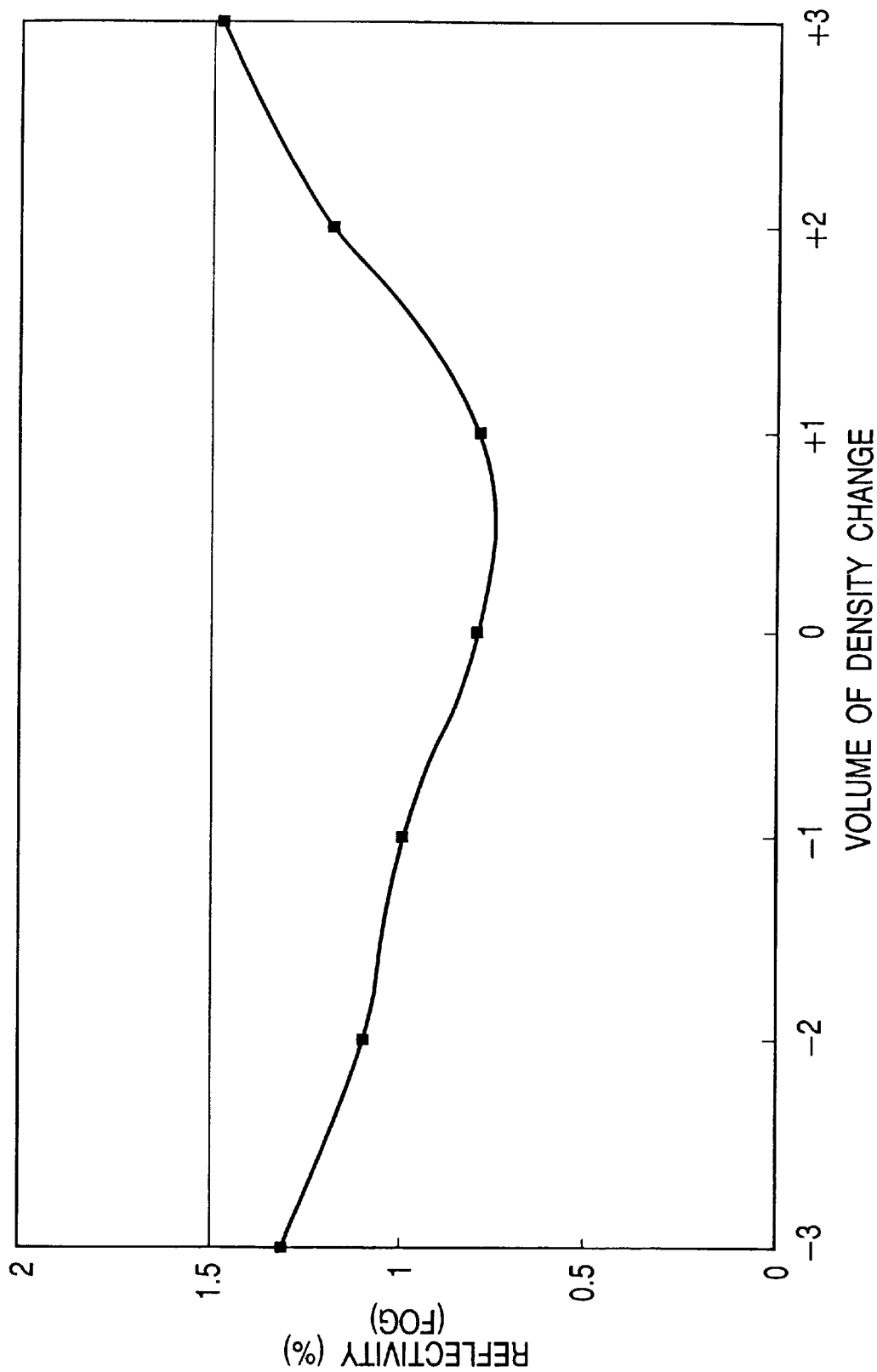
FIG. 4 is a graph showing the relation between the volume of density change and the reflectivity (fog) of the white background portion in the first embodiment.

The graph of FIG. 4 shows the relation between the volume of density change and the reflectivity (%) of the white background portion in the first embodiment.

When the density volume is changed from 0 to +3, the DC component of the developing bias changes from −500 V to −650 V, and the difference thereof from −700 V (which is the surface potential of the photosensitive body in the white background portion) becomes small and the background fog is somewhat aggravated. As the result, the reflectivity becomes nearly 1.5% which is the limit of the background fog in practical use. On the other hand, when the density volume is changed from 0 level to −3 level, the difference between the DC component of the developing bias (−350 V) and the surface potential of the white background portion (−700 V) becomes as great as −350 V, and the fog (reversal fog) by the oppositely charged toner was aggravated and approximated to the upper limit value 1.5%.

So, in the present embodiment, during the changeover of the density, not only the developing bias but also the DC components applied to the charging roller were rendered into −660 V (−3 level), −690 V (−2 level), −720 V (−1 level), −750 V (normal state, 0 level), −780 V (+1 level), −810 V (+2 level) and −840 V (+3 level) in conformity with the volume of density change.

Also, at this time, the DC components of the developing bias were rendered into −320 V (−3 level), −380 V (−2 level), −440 V (−1 level), −500 V (normal state, 0 level), −560 V (+1 level), −620 V (+2 level) and −680 V (+3 level). In the other points, the second embodiment is the same as Embodiment 1. The relation between the density of the original and the density of the output image in the respective volumes of density change was similar to that in the first embodiment.

Figure 5:
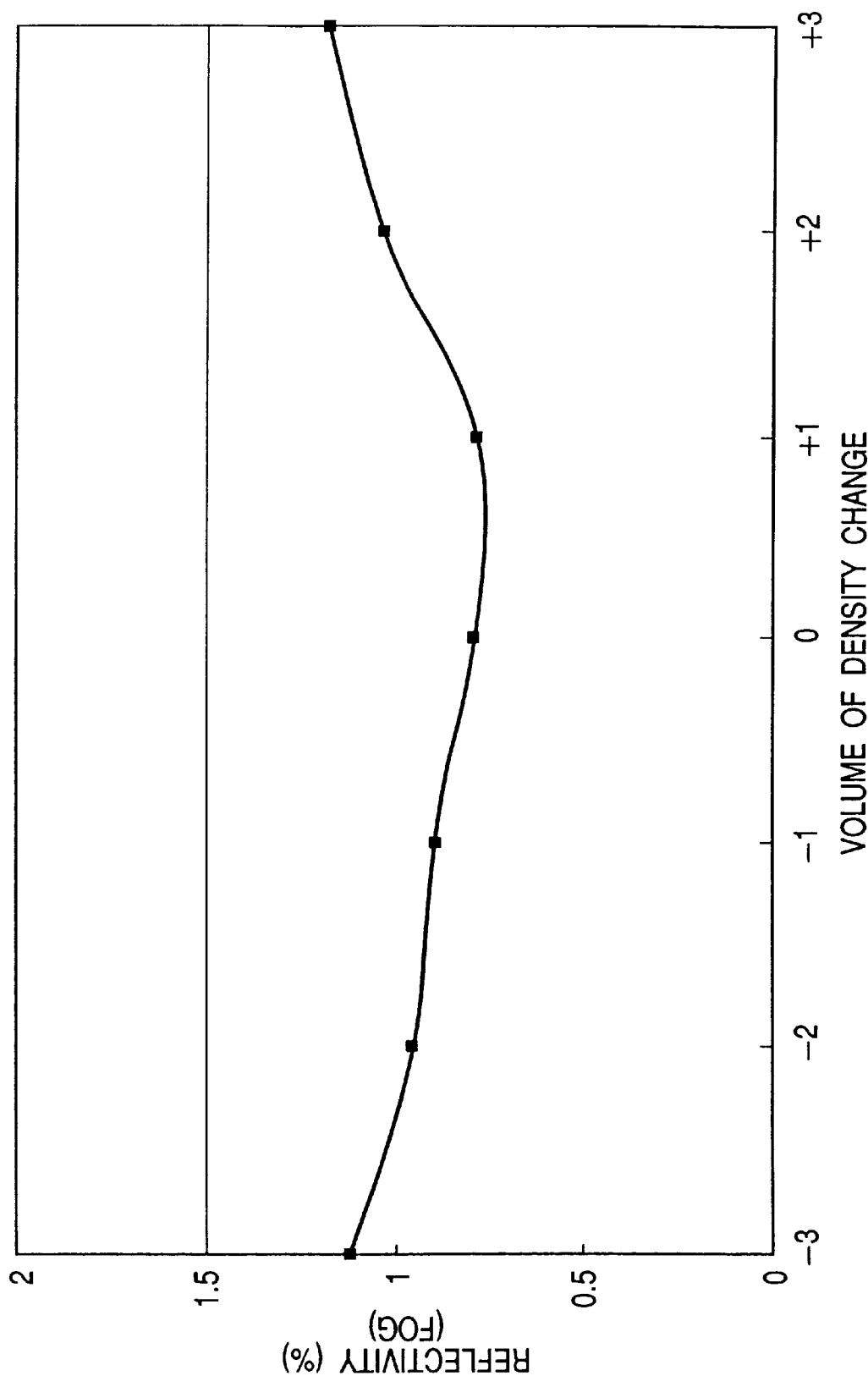
FIG. 5 is a graph showing the relation between the volume of density change and the reflectivity (fog) of the white background portion in the second embodiment.

Further, the volume of density change and the reflectivity of the white background portion at this time were as shown in the graph of FIG. 5. Also, the relations among the volume of density change, the surface potential of the photosensitive body at a laser irradiating point and the surface potential of the photosensitive body in the white background portion at this time are shown in the graph of FIG. 6.

Thereby, even when the density was made lowest or when the density was made highest, a sufficient margin could be obtained for the reflectivity as compared with 1.5%. That is, fog could be suppressed.

This is because the difference between the surface potential of the photosensitive body at the laser irradiating point and the DC component of the developing bias (the developing contrast) is similar to that in the first embodiment and the back contrast is small in its amount of change as compared with that in the first embodiment. That is, it has become possible to make the density still higher or lower depending on the user's demand.

In the present embodiment, the charging roller is used as the charging means, but of course, the use of other charger such as a corona charger or a brush charger can obtain a similar result. Also, the values of the DC bias and developing bias applied to the charging roller described in the present embodiment are not limited to these.

Figure 6:
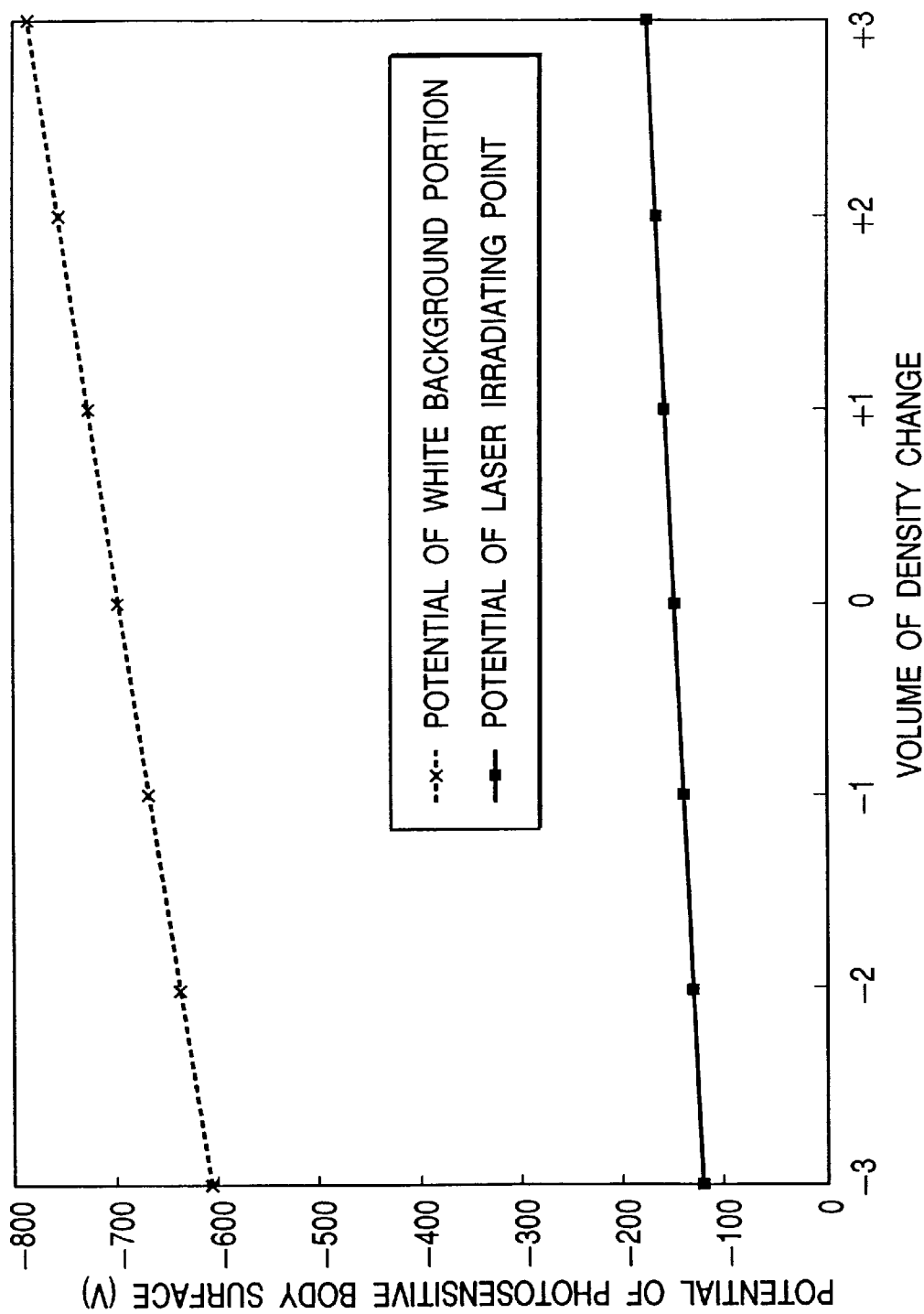
FIG. 6 is a graph showing the relations among the volume of density change, the potential of a photosensitive body surface at a laser irradiating point and the potential of the white background portion in the second embodiment.

Further, the relations in FIG. 6 among the volume of density change, the surface potential of the photosensitive body at the laser irradiating point and the surface potential of the photosensitive body in the white background portion differ depending on the material, diameter, prescription, rotational speed and exposure wavelength of the photosensitive body, and are not restricted to these values.

[Embodiment 3]

Figure 7:
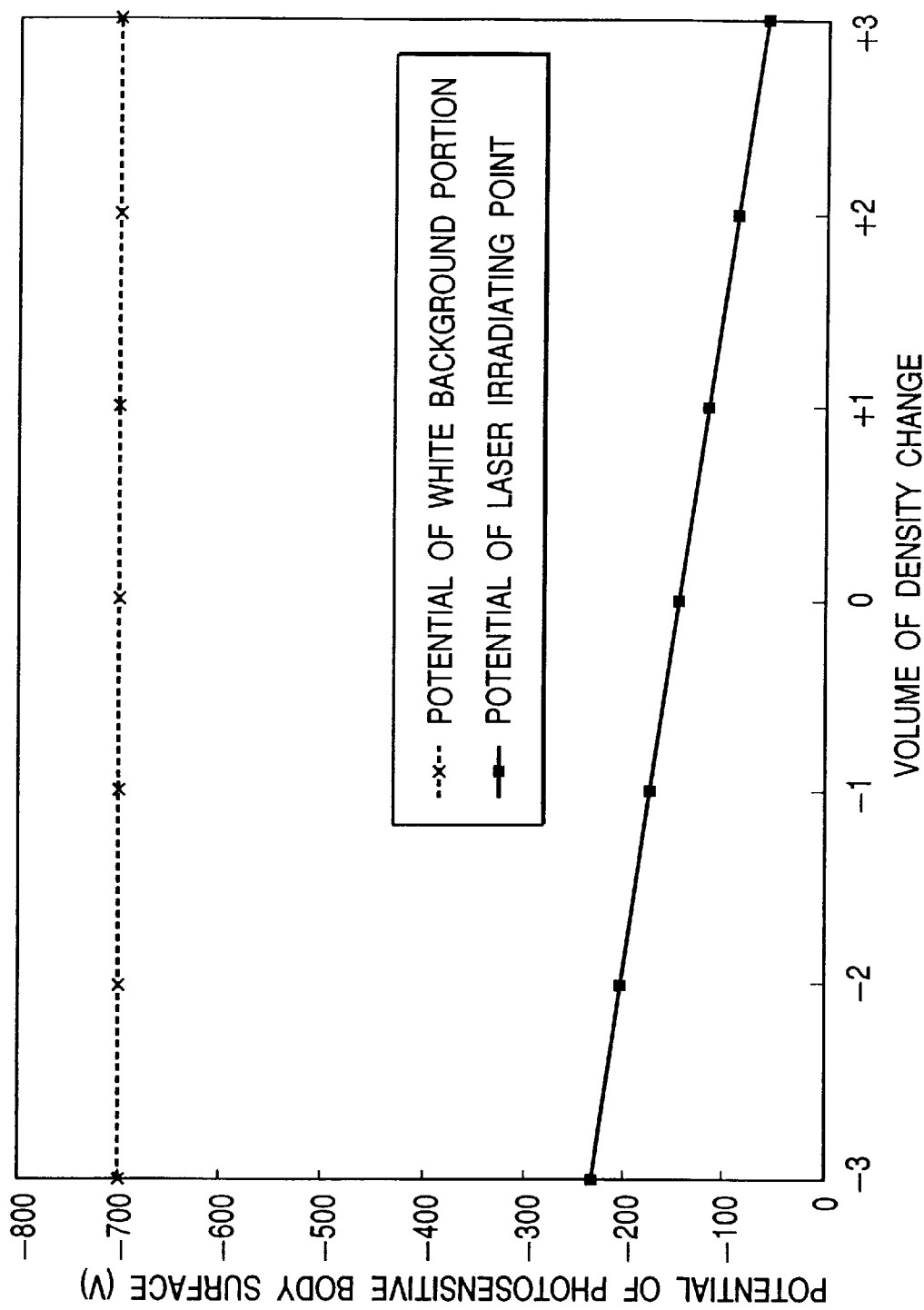
FIG. 7 is a graph showing the relations among the volume of density change, the potential of a photosensitive body surface at a laser irradiating point and the potential of the white background portion in the third embodiment.

A third embodiment of the present invention will now be described with reference to FIG. 7.

In the present embodiment, the density change in the course of image formation using the recording device was carried out by varying the laser exposure amount.

That is, while the quantity of laser light on the surface of the photosensitive body is usually 0.9 mW (the quantity of spot light when the photosensitive body is stationary), the present embodiment is designed to change over the quantity of laser light in conformity with the value of density change.

Specifically, when the quantity of stationary spot light on the surface of the photosensitive body was rendered into 0.63 mW (−3 level), 0.72 mW (−2 level), 0.81 mW (−1 level), 0.90 mW (normal state, 0 level), 0.99 mW (+1 level), 1.08 mW (+2 level) and 1.17 mW (+3 level) in conformity with the volume of density change, the relation between the density of the original and the density of the output image obtained was equal to that in the second embodiment. The relations between the volume of density change, the surface potential of the photosensitive body at the laser irradiating point and the surface potential of the photosensitive body in the white background portion at this time are shown in the graph of FIG. 7. In the other points, the third embodiment is the same as the first embodiment.

Thereby, the same developing contrast as that in the first and second embodiments can be obtained and the back contrast does not change and therefore, the fog of the white background portion is not increased even if the volume of density change is varied.

That is, fog is not caused at the top of the capability of the laser, and it is possible to make the image density when using the recording device high or low.

While in the first embodiment, by effecting the change of the DC component of the developing bias, in the second embodiment, by effecting the change of the developing bias and the DC component applied to the charging roller, and in the third embodiment, by effecting the change of the quantity of laser light, the density change in the course of image formation using the recording device has been carried out, these are not restrictive, but of course, use may be made of the change of only the DC bias component applied, for example, to the charging roller or a suitable combination of these three kinds of conditions as image density changing means. Also, the pulse width of the laser may be modulated instead of changing over the quantity of laser light.

Also, in the first to third embodiments, mention has been made of only the formation of a binary image, but of course, the present invention is also applicable to other multi-value image forming apparatus.

What is claimed is:

1. An image forming apparatus comprising:

reading means for reading an image of an original and generating an image signal corresponding to image information of the original;

recording means for recording said image signal;

image forming means for forming an image on a recording medium on the basis of the image signal generated by said reading means, said image forming means being capable of forming an image by the use of said recording means, and forming an image without the use of said recording means; and changing means for changing density of the image formed on said recording medium, wherein, when an image is formed without the use of said recording means, said changing means converts said image signal to change the density of said image, and when an image is formed by the use of said recording means, said changing means does not convert said image signal, but controls an image forming condition of said image forming means to change the density of said image when the density change is initiated in the course of the formation of said image.

2. An image forming apparatus according to claim 1, wherein, when an image is to be formed by the use of said recording means, said changing means converts said image signal to change the density of said image until it changes the density of said image in the course of the formation of said image.

3. An image forming apparatus according to claim 1, wherein said image signal is recorded in said recording means by said original being read only once by said reading means, and said image forming means is capable of forming images on a plurality of recording mediums by the use of said recording means.

4. An image forming apparatus according to claim 1, said image forming means comprising an image bearing member, electrostatic image forming means for forming an electrostatic image on said image bearing member, developing means for developing said electrostatic image by a developer, and transferring means for transferring the developed image on said image bearing member formed by said developing means to the recording medium, wherein said image forming condition is at least one of an electrostatic image forming condition of said electrostatic image forming means and a developing condition of said developing means.

5. An image forming apparatus according to claim 4, wherein said image bearing member is a photosensitive body, said electrostatic image forming means has charging means for charging said image bearing member, and exposing means for exposing said photosensitive body on the basis of said image signal, and said image forming condition is at least one of a charging condition of said charging means, an exposing condition of said exposing means and the developing condition of said developing means.

6. An image forming apparatus according to claim 5, wherein an output with which said exposing means exposes when an image is to be formed on one recording medium is one of only two values of ON and OFF.

7. An image forming apparatus according to claim 1, wherein, when an image is to be formed on only one surface of a single recording medium, the image is formed without the use of said recording means, and when an image is to be formed on a plurality of recording mediums, the image is formed by the use of said recording means.

8. An image forming apparatus according to claim 1, wherein, when an image is to be formed on only one surface of a single recording medium, the image is formed without the use of said recording means, and when an image is to be formed on each surface of a single recording medium, the images are formed by the use of said recording means.

9. An image forming apparatus comprising:

reading means for reading an image of an original and generating an image signal corresponding to image information of the original;

recording means for recording said image signal;

image forming means for forming an image on a recording medium on the basis of the image signal generated by said reading means, said image forming means being capable of effecting image formation by the use of information recorded in said recording means; and changing means for changing density of the image formed on said recording medium, wherein said changing means converts said image signal to change the density of said image when the density change is initiated before said image formation is started, and said changing means controls an image forming condition of said image forming means to change the density of said image while it does not convert said image signal when the density change is initiated in the course of said image formation.

10. An image forming apparatus according to claim 9, wherein said image signal is recorded in said recording means by said original being read only once by said reading means, and said image forming means is capable of forming images on a plurality of recording mediums by the use of said recording means.

11. An image forming apparatus according to claim 9, said image forming means comprising an image bearing member, electrostatic image forming means for forming an electrostatic image on said image bearing member, developing means for developing said electrostatic image by a developer, and transferring means for transferring the developed image on said image bearing member formed by said developing means to the recording medium, wherein said image forming condition is at least one of an electrostatic image forming condition of said electrostatic image forming means and a developing condition of said developing means.

12. An image forming apparatus according to claim 11, wherein said image bearing member is a photosensitive body, said electrostatic image forming means has charging means for charging said image bearing member, and exposing means for exposing said photosensitive body on the basis of said image signal, and said image forming condition is at least one of a charging condition of said charging means, an exposing condition of said exposing means and the developing condition of said developing means.

13. An image forming apparatus according to claim 12, wherein an output with which said exposing means exposes when an image is to be formed on one recording medium is one of only two values of ON and OFF.

14. An image forming apparatus comprising:

reading means for reading an image of an original;

recording means for recording an image signal according to the image of the original read by said reading means;

image forming means for forming an image on a recording medium on the basis of the image of the original read by said reading means, said image forming means being capable of effecting image formation by the use of the image signal recorded in said recording means; and changing means for changing density of the image formed on said recording medium, wherein said changing means converts said image signal to change the density of said image when the density change is initiated before said reading means starts reading, and said changing means controls an image forming condition of said image forming means to change the density of said image while it does not convert said image signal when the density change is initiated in the course of said image formation.

15. An image forming apparatus according to claim 14, wherein said image signal is recorded in said recording means when said original is read only once by said reading means, and said image forming means is capable of forming images on a plurality of recording mediums by the use of said recording means.

16. An image forming apparatus according to claim 14, said image forming means comprising an image bearing member, electrostatic image forming means for forming an electrostatic image on said image bearing member, developing means for developing said electrostatic image by a developer, and transferring means for transferring the developed image on said image bearing member formed by said developing means to the recording medium, wherein said image forming condition is at least one of an electrostatic image forming condition of said electrostatic image forming means and a developing condition of said developing means.

17. An image forming apparatus according to claim 16, wherein said image bearing member is a photosensitive body, said electrostatic image forming means has charging means for charging said image bearing member, and exposing means for exposing said photosensitive body on the basis of the image of the original read by said reading means, and said image forming condition is at least one of a charging condition of said charging means, an exposing condition of said exposing means and the developing condition of said developing means.

18. An image forming apparatus according to claim 17, wherein an output with which said exposing means exposes when an image is to be formed on one recording medium is one of only two values of ON and OFF.

19. An image forming apparatus comprising:

image forming means for forming an image on a recording medium on the basis of an image signal; and changing means for changing density of the image formed on said recording medium, wherein said changing means converts said image signal to change the density of said image when the density change is initiated before said image formation is started, and said changing means controls an image forming condition of said image forming means to change the density of said image while it does not convert said image signal when the density change is initiated in the course of said image formation.

* * * * *

UNITED STATES PATENT AND TRADEMARK OFFICE
CERTIFICATE OF CORRECTION

PATENT NO. : 6,112,041

DATED : August 29, 2000

INVENTOR(S): TAKEO YAMAMOTO

It is certified that error appears in the above-identified patent and that said Letters Patent is hereby corrected as shown below:

COLUMN 6
```
    Line 5,  "has been" should read --is--.
    Line 9,  "has" should be deleted.
    Line 20, "the" (first occurrence) should read --a--.
```

Signed and Sealed this

Seventeenth Day of April, 2001

Attest:

NICHOLAS P. GODICI

*Attesting Officer*   Acting Director of the United States Patent and Trademark Office